United States Patent [19]
Frixon

[11] Patent Number: 5,138,456
[45] Date of Patent: Aug. 11, 1992

[54] PROCESSES FOR TRANSMITTING VIDEO SIGNALS, VIDEO CAMERAS FOR SUCH TRANSMISSION AND APPLICATIONS OF SUCH CAMERAS

[76] Inventor: Pierre Frixon, Les Boyers, 13720 - La Bouilladisse, France

[21] Appl. No.: 582,916
[22] PCT Filed: Oct. 15, 1990
[86] PCT No.: PCT/FR89/00210
  § 371 Date: Dec. 3, 1990
  § 102(e) Date: Dec. 3, 1990
[87] PCT Pub. No.: WO90/12306
  PCT Pub. Date: Oct. 18, 1990

[30] Foreign Application Priority Data
  Apr. 29, 1988 [FR] France .................. 88 05953

[51] Int. Cl.$^5$ ................. H04N 5/38; H04N 5/40
[52] U.S. Cl. ................. 358/186; 358/189; 455/66
[58] Field of Search .......... 358/186, 195.1, 189, 358/108, 196, 194.1; 455/66, 67

[56] References Cited
U.S. PATENT DOCUMENTS

| | | | |
|---|---|---|---|
| 4,213,152 | 7/1980 | Kakinuma | 358/186 |
| 4,263,617 | 4/1981 | Chemin et al. | 358/186 |
| 4,571,621 | 2/1986 | Dalimonte et al. | 358/186 |
| 4,794,458 | 12/1988 | Nagatomi | 358/186 |
| 4,916,532 | 4/1990 | Streck et al. | 455/66 |

*Primary Examiner*—James J. Groody
*Assistant Examiner*—Glenton B. Burgess
*Attorney, Agent, or Firm*—Ladas & Parry

[57] ABSTRACT

A video camera comprises a lens 1, and image analyzer 2, management circuits 3, an incorporated programmable oscillator 4, a modulator 5, an antenna 7, a scanning tuner 8 equipped with a tuning detector circuit 12 and an electronic calculating unit 10 which controls scanning of the tuner, which records the frequencies detected by the detector 12, which selects a free frequency different from a multiple or a sub-multiple of the frequencies detected and which controls the oscillator 4 for the latter to emit a carrier frequency equal to the free frequency.

8 Claims, 1 Drawing Sheet

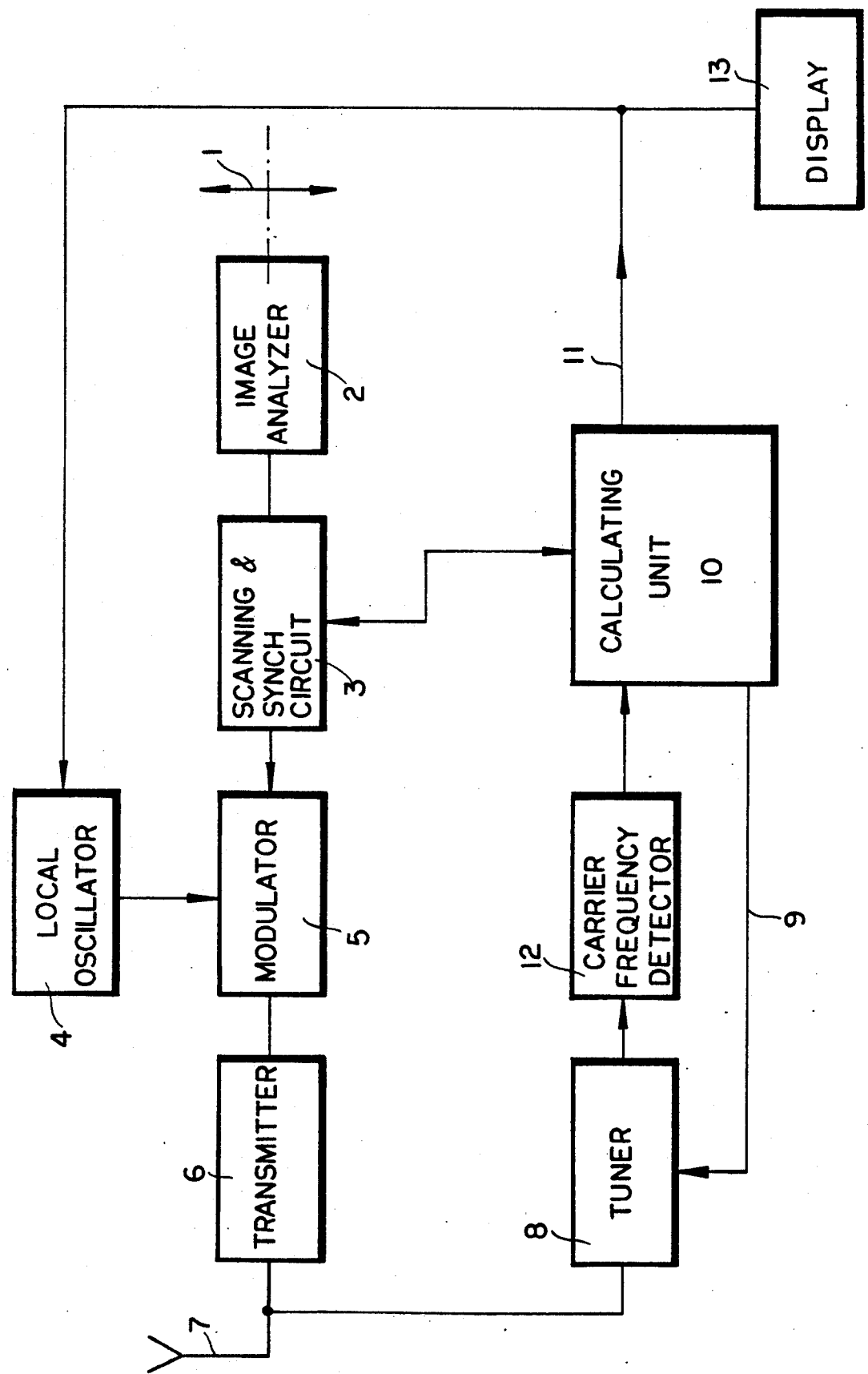

PROCESSES FOR TRANSMITTING VIDEO SIGNALS, VIDEO CAMERAS FOR SUCH TRANSMISSION AND APPLICATIONS OF SUCH CAMERAS

BACKGROUND OF THE INVENTION

The present invention has for its object processes for transmitting video signals from a video camera to a television set, video cameras for carrying out these processes and applications of these cameras.

The technical sector of the invention is that of the construction of static video cameras intended in particular for watching or for local uses, or of mobile cameras.

In numerous applications such as the watching of premises, stores, banks, appartments, etc . . . , fixed cameras are used, distributed in the premises, which transmit signals to video monitors located in a watching station.

Transmission of the signals between the cameras and the video monitors is generally effected by cables in order not to disturb reception of the public television broadcasts which are transmitted by Hertzian waves on determined channels.

Exceptionally, the authorities in charge of controlling use of the carrier frequencies may allow a local transmission by Hertzian waves on a well-determined carrier frequency, which is free in the emission zone, but such authorizations are difficult to obtain and cannot be multiplied.

The development of technologies makes it possible at the present time to construct video cameras for watching having very good performances for a reduced cost.

However, the transmission of the signals by cables between the camera and the video monitors involves considerable expenses and limits the applications of the watching cameras.

SUMMARY OF THE INVENTION

The object of the present invention is to provide means for transmitting by Hertzian waves the video signals issuing from a camera without disturbing the public television broadcasts or other transmission by Hertzian waves already in service in the signal transmission zone and, consequently, making it possible to avoid the construction costs of the signal transmission lines and to receive the images coming from a watching camera directly on television sets or on existing video monitors.

This object is attained by a process for transmitting by Hertzian waves video signals from a video camera, which comprises the following operations of: automatically detecting the carrier frequencies of video signals which are already occupied in the zone of use of the camera and transmitting the video signals issuing from the camera, by mixing them, at a free carrier frequency which is different from a multiple or a sub-multiple of the occupied frequencies.

According to a preferred embodiment, the carrier frequencies of video signals which are already occupied locally are detected by means of a tuner which is connected to a transceiver antenna and which scans the whole of the range of carrier frequencies, and a detection circuit which detects the resonance peaks; there are recorded in the memory of a calculating unit the values of the occupied frequencies, corresponding to said resonance peaks and said calculating unit is programmed to select an available carrier frequency located substantially in the middle of the largest interval between two occupied frequencies and different from a multiple or a sub-multiple of the occupied frequencies and said calculating unit controls emission by a local oscillator of a carrier frequency which corresponds to said available frequency.

A video camera according to the invention comprises:
- a programmable local oscillator which emits a carrier frequency;
- a modulator which mixes the video signals with said carrier frequency;
- a transceiver antenna;
- a scanning tuner which is connected to said antenna and which is equipped with a tuning detector circuit which detects the occupied frequencies;
- and a central calculating unit equipped with a microprocessor and memories, which controls scanning of said tuner, which records the occupied frequencies and which is programmed to select a free frequency located substantially in the middle of the largest interval between two occupied frequencies and different from a multiple or a sub-multiple of one of the occupied frequencies and to control the emission by said oscillator of a carrier frequency which corresponds to said free frequency.

A camera according to the invention preferably comprises, in addition, a display device which displays the frequency selected.

The invention results in novel video cameras adapted to be used for local image transmissions, for example as watching cameras or as cameras mounted on mobiles.

The video cameras according to the invention make it possible to transmit images by Hertzian waves to existing television sets and they therefore necessitate no cabled network, nor any particular video monitor for receiving the images, which renders them very economical to use. This result is attained whilst avoiding any risk of disturbance of the television transmitters by Hertzian waves already installed in the geographical zone where such cameras are used.

An important advantage of these video television cameras resides in the fact that they may be mass-produced, without taking into account the place where they will be used and they adapt by themselves to the local conditions by automatically selecting a non-disturbing emission frequency.

The video cameras according to the invention may be equipped with CCD sensors, integrated circuits and inexpensive optics (plastic lens), with the result that the costs of manufacturing and using these cameras is very reduced.

Very small and non-cumbersome video cameras may thus be constructed which may be mounted on mobile toys remote-controlled by radio waves, ultrasounds or by infrared rays.

Such toys may be used for example in an appartment, by following on the screen of a television set the images transmitted by the camera and attempting to avoid the obstacles thanks to the remote-control, this making a particularly attractive video game in which the images of synthesis usually appearing on the screen in the case of heretofore known video games, are replaced by real images taken by the camera.

The cameras according to the invention are also particularly adapted to be mounted on watching vehicles, for example on patrolling police vehicles which transmit the images taken by the camera directly to a fixed monitoring station.

The video cameras according to the invention which may be used whilst moving them as they comprise no connecting wire, present advantages similar to those of H.F. microphones which emit directly in high frequency the sounds picked up.

The following description refers to the accompanying drawing which schematically shows, without any limiting character, the essential components of a video camera according to the invention.

BRIEF DESCRIPTION OF THE DRAWING

The single FIGURE shows a video camera intended for watching, which is an inexpensive camera, of small dimensions and low consumption, which enables images to be obtained which are of lower quality than the images furnished by so-called top-range cameras, but of quality sufficient for the watching needs.

DESCRIPTION

This camera comprises, in known manner, a lens 1, behind which is located an image analyzer 2, constituted by a matrix sensor of CCD (Charged Coupled Device) or DTC type.

The camera further comprises the usual circuits for managing the sensor which emit the scanning signals and the synchronization pulses.

A camera according to the invention further comprises a local oscillator 4 which is programmable, for example an oscillator of VCO (Voltage Controlled Oscillator) type, which emits a frequency dependent on the voltage that it receives.

It further comprises a modulator circuit 5 which receives both the video signals emitted by the analyzer 2 and the frequency emitted by the oscillator 4 and which mixes them, with the result that the frequency emitted by the oscillator, which is a very high frequency, serves as carrier frequency.

The camera further comprises an transmitter circuit 6 of which the input is connected to the output of the modulator 5 and of which the output is connected to a small antenna 7.

The camera further comprises a tuner, i.e. a tuning circuit generally designated under the name of "TUNER" which is connected to the antenna 7.

This tuner is equipped with a frequency scanning control 9 which makes it possible to vary the frequency of the tuner over the whole range of carrier frequencies used for the Hertzian transmissions of video signals for example over a range included between 400 and 800 MHz.

The camera further comprises an electronic calculating unit 10, comprising a microprocessor, read-only and read-write memories and an input-output interface.

One of the outputs is connected to the scanning control 9 of the tuner 8.

Another output 11 is connected to the programmable oscillator 4 to control the frequency emitted thereby.

The tuner 8 is equipped with a carrier frequency detection circuit 12 which detects the coincidence between each carrier frequency picked up by the antenna 7 and one of the successive frequencies scanned by the tuner. The carrier detection circuit 12 is connected to an input of the calculating unit 10 to which it sends a signal each time it detects a tuning and the calculating unit records in its read-only memory the different tuning frequencies detected by circuit 12 during a frequency scanning.

The camera further comprises a display device 13 which is connected to the output line 11 and which displays the frequency on which the local oscillator 4 emits.

Operation of a camera according to the invention is as follows:

Before using a camera in a determined place, the microprocessor triggers off the device for automatically determining a carrier frequency which is intended automatically to select a carrier frequency, in order to eliminate any risk of emitting on a television channel already used in the region or on a neighbouring channel and therefore any risk of disturbing television broadcasts.

As soon as the camera is switched on, the microprocessor 10 controls scanning by the tuner 8 of the whole range of frequencies capable of being used as video signal carrier frequencies, for example all the frequencies included between 400 and 800 MHz.

The tuner 8 receives at the same time the carrier frequencies picked up by antenna 7.

In the course of the frequency scanning, whenever the scanning passes through one of the frequencies picked up by the antenna, the circuit 12 detects the coincidence and sends a detection signal to the calculating unit 10, which records in its memory the tuning frequency. In this way, at the end of the scan of the whole band of frequencies, the calculating unit 10 has recorded an up-to-date list of all the carrier frequencies used for all the local emitters in service.

The calculating unit then determines from among all the channels remaining free, i.e. among all the carrier frequencies authorized for local transmissions and not used at the moment of the scanning, the frequency on which the local oscillator 4 will emit, which will be the carrier frequency on which the camera will emit.

The microprocessor of the calculating unit is programmed to select an emission frequency located substantially in the middle of the largest interval separating two channels already used and a frequency which does not correspond to a multiple or a submultiple of one of the frequencies occupied in order not to disturb the latter.

Once the emission frequency has been determined, the central calculating unit 10 controls the oscillator 4 by line 11, for it to emit on this frequency. At the same time, the frequency selected is displayed on the display device 13, with the result that the user may read it and adjust his/her television set to the channel corresponding to this frequency, in order to pick up the signals emitted by the camera and to show on the screen of the television set the images which will be taken by the camera.

Whatever the carrier frequencies used in a determined place, either for public or private television broadcasts or by local transmitters or relays, or even by other cameras of the same type already in service, the cameras according to the invention automatically guarantee that the channel on which they emit can in no way disturb the other broadcasts transmitted by Hertzian waves in the same geographical sector, with the result that the authorization to use cameras according to the invention may be obtained without difficulty from the authorities in charge of controlling use of the frequencies for transmissions by Hertzian waves.

The cameras according to the invention may therefore be used near an existing television set to obtain an image on the screen of this set without having to use anything other than the camera.

The cameras according to the invention not being connected to a cable, may be used as mobile cameras, for example as cameras mounted on a robot, on a manipulator arm, on mobile toys, etc. . . . .

It is specified that the local oscillator 4 may be constituted by a digital synthesis circuit.

Of course, the cameras according to the invention comprise circuits for electrical supply from rechargeable batteries.

The cameras according to the invention make it possible in particular to construct novel mobile toys carrying a small camera according to the invention, non-cumbersome and inexpensive and also comprising known remote-control means by radio waves, ultra-sounds or by infrared rays.

A child can use such a toy in an appartment, watching on the screen of the appartment's television set the images transmitted by the camera and he can use the remote-control to play at avoiding the obstacles which appear in the field of the camera. In this way, a very attractive video game is obtained in which the images which appear on the screen of the television set are real images and the movements of the toy are also real, instead of the images of synthesis and the control knobs of the electronic video games known up to the present time.

In the same way, a camera according to the invention may be mounted on a remote-controlled robot which may be manoeuvred from the images appearing on the screen of a television set of current type.

What is claimed is:

1. Video camera comprising:
   a programmable local oscillator 4 which emits a carrier frequency;
   a modulator 5 which mixes the video signals with said carrier frequency;
   a transceiver antenna 7;
   a scanning tuner 8 which is connected to said antenna 7 and which is equipped with a tuning detector circuit 12 which detects occupied frequencies;
   and a central calculating unit 10 equipped with a microprocessor and memories, which controls scanning of said tuner 8, which records the occupied frequencies and which is programmed to select a free frequency located substantially in the middle of the largest interval between two occupied frequencies and different from a multiple or a sub-multiple of one of the occupied frequencies and to control the emission by said oscillator 4 of a carrier frequency which corresponds to said free frequency.

2. Video camera according to claim 1, further comprising a display device 11 which displays the frequency selected.

3. Video camera according to claim 1, where said local oscillator is constituted by a digital sinusoidal signal synthesis circuit incorporated in said calculating unit 10.

4. Applications of video cameras according to claim 1, where said cameras are incorporated in watching devices or in remote-controlled automats and the video images are transmitted by Hertzian waves to television sets equipping a monitoring or remote-control station.

5. Applications of video cameras according to claim 1, where said cameras are mounted on mobile toys and the video images are received by domestic television sets.

6. Applications according to claim 5, characterized in that said mobile toys comprise remote-control means.

7. Application of video cameras according to claim 1, where said cameras are mounted on watching vehicles and the images emitted by the cameras are transmitted by Hertzian waves to television sets located in a watching premises.

8. Process for transmitting by Hertzian waves video signals from a video camera to video monitors placed in a signal transmitting zone of use of the camera, comprising:
   automatically detecting carrier frequencies of video signals which are already occupied in a zone of use of the camera, said detection step comprising scanning the whole of the range of carrier frequencies by means of a tuner connected to a transceiver antenna and detecting resonance peaks by means of a detection circuit;
   recording values of tuner frequencies corresponding to said resonance peaks which are carrier occupied frequencies, in a memory of a calculating unit;
   selecting by said calculating unit, an available carrier frequency located substantially in the middle of the largest interval between two occupied frequencies, and different from a multiple or a submultiple of the occupied frequencies;
   controlling emission by said calculating unit of a local oscillator at a carrier frequency which corresponds to said available frequency;
   transmitting video signals issued from the camera by mixing them at this available frequency.

* * * * *